US010565996B2

(12) United States Patent
Sharifi et al.

(10) Patent No.: US 10,565,996 B2
(45) Date of Patent: Feb. 18, 2020

(54) SPEAKER IDENTIFICATION

(71) Applicant: Google LLC, Mountain View, CA (US)

(72) Inventors: Matthew Sharifi, Kilchberg (CH); Ignacio Lopez Moreno, New York, NY (US); Ludwig Schmidt, Cambridge, MA (US)

(73) Assignee: Google LLC, Mountain View, CA (US)

( * ) Notice: Subject to any disclaimer, the term of this patent is extended or adjusted under 35 U.S.C. 154(b) by 495 days.

(21) Appl. No.: 15/170,264

(22) Filed: Jun. 1, 2016

(65) Prior Publication Data

US 2016/0275953 A1 Sep. 22, 2016

Related U.S. Application Data

(63) Continuation of application No. 14/523,198, filed on Oct. 24, 2014.

(60) Provisional application No. 61/899,434, filed on Nov. 4, 2013.

(51) Int. Cl.
| | |
|---|---|
| *G10L 17/02* | (2013.01) |
| *G10L 17/00* | (2013.01) |
| *G10L 17/08* | (2013.01) |
| *G10L 17/18* | (2013.01) |
| *G10L 25/51* | (2013.01) |

(52) U.S. Cl.
CPC ............ *G10L 17/02* (2013.01); *G10L 17/005* (2013.01); *G10L 17/08* (2013.01); *G10L 17/18* (2013.01); *G10L 25/51* (2013.01)

(58) Field of Classification Search
CPC ................................. G10L 17/00; G10L 17/22

USPC ......................................................... 704/246
See application file for complete search history.

(56) References Cited

U.S. PATENT DOCUMENTS

| | | | |
|---|---|---|---|
| 5,150,449 A | 9/1992 | Yoshida et al. | |
| 5,600,753 A | 2/1997 | Iso | |
| 5,614,940 A * | 3/1997 | Cobbley | G06F 17/30817 348/E5.108 |
| 5,903,863 A | 5/1999 | Wang | |
| 6,185,527 B1 * | 2/2001 | Petkovic | G06F 17/30746 704/231 |
| 6,397,179 B2 | 5/2002 | Crespo et al. | |
| 6,556,710 B2 | 4/2003 | Pass et al. | |

(Continued)

FOREIGN PATENT DOCUMENTS

| | | |
|---|---|---|
| EP | 0574951 | 12/1993 |
| WO | 2007/131530 | 11/2007 |

OTHER PUBLICATIONS

Notice of Allowance issued in U.S. Appl. No. 14/523,198 dated Sep. 20, 2016, 16 pages.

(Continued)

*Primary Examiner* — Shaun Roberts
(74) *Attorney, Agent, or Firm* — Fish & Richardson P.C.

(57) ABSTRACT

Methods, systems, and apparatus, including computer programs encoded on a computer storage medium, for performing speaker identification. In some implementations, data identifying a media item including speech of a speaker is received. Based on the received data, one or more other media items that include speech of the speaker are identified. One or more search results are generated that each reference a respective media item of the one or more other media items that include speech of the speaker. The one or more search results are provided for display.

20 Claims, 4 Drawing Sheets

(56) References Cited

U.S. PATENT DOCUMENTS

| | | | |
|---|---|---|---|
| 6,941,275 B1* | 9/2005 | Swierczek | G06Q 30/0623 705/26.61 |
| 7,003,672 B2 | 2/2006 | Angelo | |
| 7,343,553 B1* | 3/2008 | Kaye | G06F 16/68 704/244 |
| 7,444,353 B1* | 10/2008 | Chen | H04L 67/02 |
| 7,565,139 B2 | 7/2009 | Neven, Sr. et al. | |
| 7,725,318 B2* | 5/2010 | Gavalda | G10L 15/32 704/251 |
| 7,761,466 B1 | 7/2010 | Eshghi | |
| 7,844,466 B2 | 11/2010 | Roy | |
| 8,190,604 B2 | 5/2012 | Wen et al. | |
| 8,270,723 B2 | 9/2012 | Wu | |
| 8,364,660 B2 | 1/2013 | Delgo et al. | |
| 8,433,577 B2 | 4/2013 | Sharifi et al. | |
| 8,566,093 B2 | 10/2013 | Vair et al. | |
| 8,620,136 B1* | 12/2013 | Malegaonkar | H04N 5/781 386/239 |
| 8,782,072 B2 | 7/2014 | Bennett | |
| 8,805,683 B1* | 8/2014 | Wiseman | G10L 15/22 379/88.01 |
| 9,171,545 B2* | 10/2015 | Basso | G06F 17/30796 |
| 9,311,915 B2 | 4/2016 | Weinstein | |
| 9,396,180 B1* | 7/2016 | Salvador | H04N 21/233 |
| 2001/0044719 A1* | 11/2001 | Casey | G10L 15/02 704/245 |
| 2002/0156626 A1 | 10/2002 | Hutchison | |
| 2002/0180803 A1* | 12/2002 | Kaplan | G06F 17/30017 715/810 |
| 2003/0125945 A1* | 7/2003 | Doyle | G10L 15/01 704/246 |
| 2003/0200157 A1* | 10/2003 | Krajec | G06Q 10/087 705/28 |
| 2004/0015993 A1* | 1/2004 | Yacenda | H04N 7/17336 725/87 |
| 2004/0021684 A1* | 2/2004 | Millner | H04N 21/234318 715/719 |
| 2004/0031057 A1* | 2/2004 | Waites | H04N 7/17309 725/110 |
| 2004/0056879 A1* | 3/2004 | Erdelyi | H04N 7/163 715/716 |
| 2004/0078816 A1* | 4/2004 | Johnson | H04N 5/44543 725/52 |
| 2004/0199387 A1* | 10/2004 | Wang | G06Q 30/06 704/243 |
| 2006/0111904 A1 | 5/2006 | Wasserblat et al. | |
| 2008/0263360 A1* | 10/2008 | Haitsma | G06K 9/00744 713/180 |
| 2009/0043573 A1* | 2/2009 | Weinberg | G10L 17/06 704/223 |
| 2009/0099845 A1 | 4/2009 | George | |
| 2009/0122198 A1 | 5/2009 | Thorn | |
| 2009/0199235 A1 | 8/2009 | Surendran | |
| 2010/0106501 A1* | 4/2010 | Miki | G10L 17/04 704/243 |
| 2010/0211693 A1* | 8/2010 | Master | G10L 25/51 709/238 |
| 2010/0223057 A1 | 9/2010 | Capman | |
| 2011/0022609 A1* | 1/2011 | Grover | G06F 17/30637 707/755 |
| 2012/0029917 A1* | 2/2012 | Chang | H04L 51/32 704/235 |
| 2012/0053936 A1* | 3/2012 | Marvit | G10L 15/26 704/235 |
| 2012/0065976 A1 | 3/2012 | Deng et al. | |
| 2012/0078613 A1 | 3/2012 | Kandekar | |
| 2012/0095764 A1 | 4/2012 | Jeon | |
| 2013/0225128 A1 | 8/2013 | Gomar | |
| 2014/0019484 A1 | 1/2014 | Coppin et al. | |
| 2014/0108288 A1* | 4/2014 | Calman | H04N 7/155 705/342 |
| 2014/0222428 A1 | 8/2014 | Cumani | |
| 2015/0066920 A1* | 3/2015 | Barta | G06F 17/30837 707/726 |

OTHER PUBLICATIONS

'Wikipedia' [online]. "Factor Analysis," downloaded from the internet on Jul. 15, 2013, http://en.wikipedia.org/w/index.php?title=Factor_analysis&oldid=559725962, 14 pages.

'Wikipedia' [online]. "Hash function, " Oct. 20, 2014 [retrieved on Oct. 24, 2014]. Retrieved from the Internet: URL<http://en.wikipedia.org/wiki/Hash_function>, 14 pages.

'Wikipedia' [online]. "Hash table," Oct. 20, 2014 [retrieved on Oct. 24, 2014]. Retrieved from the Internet: URL<http://en.wikipedia.org/wiki/Hash_table>, 18 pages.

'Wikipedia' [online]. "Latent Variable," downloaded from the internet on Jul. 15, 2013, http://en.wikipedia.org/w/index.php?title=Latent_variable&oldid=555584475, 3 pages.

'Wikipedia' [online]. "Locality-sensitive hashing," Oct. 15, 2014 [retrieved on Oct. 24, 2014]. Retrieved from the Internet: URL<http://en.wikipedia.org/wiki/Locality-sensitive_hashing>, 7 pages.

'Wikipedia' [online]. "Speech Recognition," downloaded from the internet on Jul. 15, 2013, http://en.wikipedia.org/w/index.php?Speech_recognition&oldid=555081415, 13 pages.

Abad, Alberto, "The $L^2F$ Language Recognition System for NIST LRE 2011", The 2011 NIST Language Recognition evaluation (LRE11) Workshop, Atlanta, US, Dec. 2011, 7 pages.

Andoni and Indyk, "Efficient algorithms for substring near neighbor problem," in ACM-SIAM symposium on Discrete algorithm (SODA), 2006, pp. 1203-1212.

Andoni and Indyk, "Near-optimal hashing algorithms for approximate nearest neighbor in high dimensions," in IEEE Symposium on Foundations of Computer Science (FOCS), Oct. 2006, pp. 459-468.

Aronowitz, "Text-dependent speaker verification using a small development set," in Proc. Odyssey Speaker and Language Recognition Workshop, 2012, 28 pages.

Auckenthaler et al., "Score normalization for text-independent speaker verification systems," Digital Signal Processing, 10: 42-54, 2000.

Bahari et al., "Accent Recognition Using I-Vector, Gaussian Mean Supervector and Gaussian Posterior Probability Supervector for Spontaneous Telephone Speech," 2013 IEEE International Conference on Acoustics, Speech, and Signal Processing (ICASSP), 5 pages.

Bahari et al., "Age Estimation from Telephone Speech using i-vectors", Interspeech 2012, 13th Annual Conference of the International Speech Communication Association, 4 pages.

Baluja and Covell, "Content fingerprinting using wavelets," in European Conference on Visual Media Production (CVMP), 2006, 10 pages.

Bennani et al., "Connectionist approaches for automatic speaker recognition," in ESCA Workshop on Automatic Speaker Recognition, Identification and Verification, 1990, 265-268.

Broder, "On the resemblance and containment of documents," in Compression and Complexity of Sequences, Jun. 1997, pp. 21-29.

Campbell Jr., "Testing with the YOHO CD-ROM voice verification corpus," in International Conference on Acoustics, Speech, and Signal Processing (ICASSP), May 1995, vol. 1, pp. 341-344.

Casey and Slaney, "Fast recognition of remixed music audio," in IEEE International Conference on Acoustics, Speech and Signal Processing (ICASSP), Apr. 2007, pp. IV-1425-IV-1428.

Casey and Slaney, "Song intersection by approximate nearest neighbor search," in International Conference on Music Information Retrieval (ISMIR), pp. 144-149, Oct. 2006.

Casey et al., "Analysis of minimum distances in high-dimensional musical spaces," IEEE Transactions on Audio, Speech, and Language Processing, vol. 16, No. 5, pp. 1015-1028, Jul. 2008.

Casey, "AudioDB: Scalable approximate nearest-neighbor search with automatic radius-bounded indexing," The Journal of the Acoustical Society of America, vol. 124, No. 4, pp. 2571-2571, 2008.

(56) References Cited

OTHER PUBLICATIONS

Charikar, "Similarity estimation techniques from rounding algorithms," in ACM Symposium on Theory of Computing (STOC), May 2002, pp. 380-388.
D'Haro, Luis Ferdinand et al., "Phonotactic Language Recognition using i-vectors and Phoneme Posteriogram Counts", Interspeech 2012, 13th Annual Conference of the International Speech Communication Association , 4 pages.
Dahl et al., "Improving deep neural networks for LVCSR using rectified linear units and dropout," in Proc. ICASSP, 2013, 5 pages.
Dean et al., "Large scale distributed deep networks," in NIPS, 2012, 1232-1240.
Dehak et al., "Front-end factor analysis for speaker verification," IEEE Transactions on Audio, Speech, and Language Processing, vol. 19, No. 4, pp. 788-798, Feb. 2011.
Dehak et al., "Language Recognition via Ivectors and Dimensionality Reduction", Interspeech 2011, 12th Annual Conference of the International Speech Communication Association, 4 pages.
Goodfellow et al., "Maxout networks," in Proc. JMLR, 2013, 1319-1327.
Har-Peled et al., "Approximate nearest Neighbor: Towards removing the curse of dimensionality," Theory of Computing, vol. 8, No. 14, pp. 321-350, Jul. 2012.
Hatch et al., "Within-class covariance normalization for SVM-based speaker recognition," in International Conference on Spoken Language Processing (INTERSPEECH), Sep. 2006, 4 pages.
Hinton et al., "Deep neural networks for acoustic modeling in speech recognition," IEEE Signal Processing Magazine, 29:82-97, Nov. 2012.
Hinton et al., "Improving neural networks by preventing co-adaptation of feature detectors," in arXive preprint, 2012, 1-18.
Indyk and Motwani, "Approximate nearest neighbors: towards removing the curse of dimensionality," in ACM Symposium on Theory of Computing (STOC), 1998, pp. 604-613.
International Search Report and Written Opinion in International Application No. PCT/US2014/044528, dated Oct. 2, 2014, 10 pages.
I-Vectors from ALIZE wiki, downloaded from the internet on Jul. 15, 2013, http://mistral.univ-avignon.fr/mediawiki/index.php/I-Vectors, 2 pages.
Jeon and Cheng, "Efficient speaker search over large populations using kernelized locality-sensitive hashing," in IEEE International Conference on Acoustics, Speech and Signal Processing (ICASSP), Mar. 2012, pp. 4261-4264.
Jeon et al., "An utterance comparison model for speaker clustering using factor analysis," in IEEE International Conference on Acoustics, Speech and Signal Processing (ICASSP), May 2011, pp. 4528-4531.
Kenny et al., "A study of interspeaker variability in speaker verification," IEEE Transactions on Audio, Speech, and Language Processing, vol. 16, No. 5, pp. 980-988, Jul. 2008.
Kenny et al., "Joint Factor Analysis versus Eigenchannels in Speaker Recognition," IEEE Transactions on Audio, Speech, and Language Processing, 15: 1435-1447, 2007.
Kenny et al., "Speaker and session variability in GMM-based speaker verification," IEEE Transactions on Audio, Speech, and Language Processing, 15: 1448-1460, 2007.
Kenny, "Bayesian speaker verification with heavy-tailed priors," in Odyssey: The Speaker and Language Recognition Workshop, Jun.-Jul. 2010, 10 pages.
Kenny, "Joint factor analysis of speaker and session variability: theory and algorithms," Tech report CRIM-06/08-13, 2005, 17 pages.
Kinnunen et al., "Real-time speaker identification and verification," IEEE Transactions on Audio, Speech and Language Processing, Jan. 1, 2006, 14(1):277-288.
Kulis and Grauman, "Kernelized locality-sensitive hashing for scalable image search," in IEEE International Conference on Computer Vision (ICCV), Sep.-Oct. 2009, pp. 2130-2137.
Larcher et al. "Phonetically-constrained PLDA modeling for text-dependent speaker verification with multiple short utterances," in Proc. ICASSP, May 26-31, 2013, 7673-7677.
Larcher, Anthony et al., "I-Vectors in the Context of Phonetically-Constrained Short Utterances for Speaker Verification", 2012 IEEE International Conference on Acoustics, Speech and Signal Processing (ICASSP), 4 pages.
Lee et al.,"Unsupervised feature learning for audio classification using convolutional deep belief networks," in NIPS, 2009, 1-9.
Lei, "Joint Factor Analysis (JFA) and i-vector Tutorial," Slideshow Presentation [accessed Sep. 1, 2014], publically available before Oct. 24, 2014. Retrieved from the Internet: URL<http://www1.icsi.berkeley.edu/Speech/presentations/AFRL_ICS_visit2_JFA_tutorial_icsitalk.pdf>, 26 pages.
Magas et al., "mHashup: fast visual music discovery via locality sensitive hashing," in ACM SIGGRAPH new tech demos, Aug. 2008, 1 page.
Martinez, David et al., "IVector-Based Prosodic System for Language Identification", 2012 IEEE International Conference on Acoustics, Speech and Signal Processing (ICASSP), 4 pages.
Martinez, David et al., "Language Recognition in iVectors Space", Interspeech 2011, 12th Annual Conference of the International Speech Communication Association , 4 pages.
McLaren and van Leeuwen, "Improved speaker recognition when using i-vectors from multiple speech sources," 2011 IEEE International Conference on Acoustics, Speech and Signal Processing (ICASSP), May 2011, pp. 5460-5463.
Mohamed et al., "Deep Belief Networks for phone recognition," ICASSP, 2011, 1-9.
Nair et al., "Rectified linear units improve restricted Boltzmann machines," in ICML, 2010, 8 pages.
Oglesby et al., "Optimisation of neural models for speaker identification," in Proc. ICASSP, Apr. 3-6, 1990, 1:261-264.
Pathak and Raj, "Privacy-preserving speaker verification as password matching," in IEEE International Conference on Acoustics, Speech and Signal Processing (ICASSP), Mar. 2012, pp. 1849-1852.
Reynolds et al., "Speaker Verification Using Adapted Gaussian Mixture Models," Digital Signal Processing 10, 19-41 (2000).
Reynolds, "An overview of automatic speaker recognition technology," in IEEE International Conference on Acoustics, Speech, and Signal Processing (ICASSP), May 2002, pp. IV-4072-IV-4075.
Senoussaoui et al., "An i-vector Extractor Suitable for Speaker Recognition with both Microphone and Telephone Speech," in IEEE-Odyssey, Brno, Czech Republic, 2010, 6 pages.
Singer, Elliot et al., "The MITLL NIST LRE 2011 Language Recognition System", Odyssey 2012, The Speaker and Language Recognition Workshop, Jun. 25-28, 2012, Singapore, 7 pages.
Stafylakis et al., "Preliminary investigation of Boltzmann machine classifiers for speaker recognition," in Proc. Odyssey Speaker and Language Recognition Workshop, 2012, 8 pages.
Stafylakis et al., "Text-dependent speaker recognition using PLDA with uncertainty propagation," in Proc. Interspeech, 2013, 5 pages.
Sundaram et al., "Streaming similarity search over one billion tweets using parallel locality sensitive hashing," in International Conference on Very Large Data Bases (VLDB), vol. 6 Issue 14, Sep. 2013, pp. 1930-1941.
Variani et al., "Deep neural networks for small footprint text-dependent speaker verification," 2014 IEEE International Conference on Acoustics, Speech and Signal Processing (ICASSP), May 2014, pp. 4052-4056.
Yegnanarayana et al., "AANN: an alternative to GMM for pattern recognition," Neural Networks, 15(3):459-469, 2002.
Gibbon et al., "Browsing and Retrieval of Full Broadcast-Quality Video," Proc. Packet Video Conf., 1999, pp. 1-15.
Hauptmann et al., "Video Retrieval using Speech and Image Information," Electronic Imaging Conference (EI'03), Storage Retrieval for Multimedia Databases, Santa Clara, CA, Jan. 20-24, 2003, pp. 1-12.
Hauptmann, "Lessons for the Future from a Decade of Informedia Video Analysis Research," CIVR'05 Proceedings of the 4th international conference on Image and Video Retrieval, 2005, pp. 1-10.

(56) References Cited

OTHER PUBLICATIONS

Hughes and Sudderth, "Nonparametric Discovery of Activity Patterns from Video Collections," 2012 IEEE Computer Society Conference on Computer Vision and Pattern Recognition Workshops, Jun. 2012, pp. 25-32.
Kubat et al., "TotalRecall: Visualization and Semi-Automatic Annotation of Very Large Audio-Visual Corpora," ICMI'07, Proceedings of the 9th international conference on Multimodal interfaces, Nov. 2007, pp. 208-215.
Lei et al., "User Verification: Matching the Uploaders of Videos Across Accounts," 2011 IEEE International Conference on Acoustics, Speech and Signal Processing (ICASSP), May 2011, pp. 2404-2407.
Palmer et al., "Feature Selection for Trainable Multilingual Broadcast News Segmentation," HLT-NAACL-Short '04 Proceedings of HLT-NAACL 2004: Short Papers, 2004, pp. 89-92.
Poignant et al., "Towards a better integration of written names for unsupervised speakers identification in videos," Proceedings of the First Workshop on Speech, Language and Audio in Multimedia (SLAM), Marseille, France, Aug. 22-23, 2013, pp. 84-89.
Poignant et al., "Unsupervised Speaker Identification in TV Broadcast Based on Written Names," IEEE/ACM Transactions on Audio, Speech, and Language Processing, 23(1):57-68, Nov. 2014.
Rouvier et al., "Robust Audio-based Classification of Video Genre," in INTERSPEECH, 2009, pp. 1159-1162.
'www.google.com' [online] "Search by Image," Jun. 15, 2011, [retrieved on Mar. 1, 2017] Retrieved from Internet: URL<https://www.google.com/intl/en-419/insidesearch/features/images/searchbyimage.html> 3 pages.

\* cited by examiner

SPEAKER IDENTIFICATION

CROSS-REFERENCE TO RELATED APPLICATIONS

This application is a continuation of U.S. application Ser. No. 14/523,198, filed Oct. 24, 2014, which claims the benefit of U.S. Provisional Patent Application Ser. No. 61/899,434, filed Nov. 4, 2013, which are incorporated by reference.

TECHNICAL FIELD

This specification generally relates to speech recognition systems, and some implementations relate to determining or verifying an identity of a speaker.

BACKGROUND

Speaker identification generally involves determining a likely identity of a speaker based on speech samples from the speaker. Often, the more potential speaker identities a system has to select from among, the more computation and time is required to identify the correct speaker from among the potential speaker identities.

SUMMARY

Speaker identification is an important area of speech processing. In addition to identification accuracy, large-scale applications of speaker identification give rise to another challenge: fast search in the database of speakers. As discussed below, a system for speaker identification can use speaker vectors such as identity vectors ("i-vectors") and locality sensitive hashing, an algorithm for fast nearest-neighbor search in high dimensions. The connection between the two techniques is the cosine distance: the cosine distance may be used to compare vectors, and locality sensitive hashing allows approximation of the cosine distance in the retrieval procedure. In some implementations, an approach that combines the use of speaker vector techniques and locality sensitive hashing can be faster than a linear search while maintaining high identification accuracy.

In one general aspect, a method includes: obtaining an utterance vector that is derived from an utterance; determining hash values for the utterance vector according to multiple different hash functions; determining a set of speaker vectors from a plurality of hash tables using the hash values, each speaker vector being derived from one or more utterances of a respective speaker; comparing the speaker vectors in the set with the utterance vector; and selecting a speaker vector based on comparing the speaker vectors in the set with the utterance vector.

Implementations may include one or more of the following features. For example, the utterance vector includes obtaining an utterance i-vector for the utterance, the utterance i-vector comprising parameters determined using multivariate factor analysis of the utterance; and determining the set of speaker vectors from the plurality of hash tables using the hash values includes determining a set of speaker i-vectors from the plurality of hash tables, each speaker i-vector comprising parameters determined using multivariate factor analysis of one or more utterances of a respective speaker. Obtaining the utterance vector includes obtaining an utterance vector comprising parameters determined based on deep neural network activations that occur in response to information about the utterance being provided to the deep neural network; and determining the set of speaker vectors from the plurality of hash tables using the hash values includes determining a set of speaker vectors in which each speaker vector includes parameters determined based on deep neural network activations that occur in response to information about one or more utterances of a respective speaker being provided to the deep neural network.

Implementations may include one or more of the following features. For example, accessing data indicating associations between the speaker vectors and respective speakers; determining, based on the data indicating the associations between the speaker vectors and the respective speakers, a speaker identity corresponding to the selected speaker vector; and outputting data indicating the speaker identity. The method may include: identifying one or more media items that include utterances of a speaker corresponding to the selected speaker vector; and outputting data indicating the identified one or more media items. The method may include: determining that the selected speaker vector corresponds to a particular user; and based at least in part on the determining that the selected speaker vector corresponds to a particular user identity, authenticating the particular user.

Implementations may include one or more of the following features. For example, determining the hash values includes determining the hash values using one or more locality sensitive hash functions. Determining the hash values includes determining the hash values based on a position of the utterance vector with respect to different hyperplanes. Determining the hash values includes: determining first hash values for the utterance vector based on a first set of hash functions; and determining second hash values as different combinations of two or more of the first hash values; where determining the set of speaker vectors from the plurality of hash tables using the hash values includes determining the set of speaker vectors from the plurality of hash tables using the second hash values. Comparing the speaker vectors in the set with the utterance vector includes determining similarity scores that each indicate a degree of similarity of the utterance vector and one of the speaker vectors in the set; and selecting a speaker vector includes selecting the speaker vector that the similarity scores indicate is most similar to the utterance vector.

Implementations may include one or more of the following features. For example, determining similarity scores that each indicate a degree of similarity of the utterance vector and one of the speaker vectors in the set includes determining a cosine distance between the utterance vector and each of the speaker vectors in the set. Selecting the speaker vector that the similarity scores indicate is most similar to the utterance vector includes: identifying the smallest cosine distance from among the determined cosine distances; determining that the smallest cosine distance is less than a maximum distance threshold value; and based on determining that the smallest cosine distance is less than the maximum distance threshold value, selecting the speaker vector corresponding to the smallest cosine distance. Each of the speaker vectors corresponds to a different speaker; and the method further includes providing data indicating that the speaker corresponding to the selected speaker vector is the speaker of the utterance. The method may include obtaining multiple speaker vectors that each indicate characteristics of speech of a respective speaker; and, for each particular speaker vector of the multiple speaker vectors: determining hash values for the particular speaker vector according to each of the multiple different hash functions; and inserting the particular speaker vector into each of the plurality of hash tables based on the hash values. Obtaining multiple speaker vectors that each indicate characteristics of speech of a respective speaker includes: accessing a set of multiple video resources; and generating a speaker vector for each of the multiple video resources.

In another general aspect, a method includes: obtaining an utterance i-vector for an utterance; determining hash values for the utterance i-vector according to multiple different hash functions; determining a set of speaker i-vectors from a plurality of hash tables using the hash values; comparing the speaker i-vectors in the set with the utterance i-vector; and selecting a speaker i-vector based on comparing the speaker i-vectors in the set with the utterance i-vector.

In another general aspect, a method includes: obtaining multiple speaker i-vectors that each correspond to a different speaker; and for each of the multiple speaker i-vectors: (i) determining hash values for the speaker i-vector according to multiple different hash functions; and (ii) inserting the speaker i-vector into a plurality of hash tables based on the hash values.

Implementations may include one or more of the following features. For example, determining the hash values includes determining the hash values using locality sensitive hash functions. Determining the hash values includes determining the hash values based on a position of the speaker i-vector with respect to different hyperplanes. Determining hash values for the speaker i-vector according to multiple different hash functions includes: determining first hash values for the speaker i-vector based on a first set of hash functions; and determining second hash values as different combinations of two or more of the first hash values. Inserting the speaker i-vector into a plurality of hash tables based on the hash values includes inserting the speaker i-vector into each of the plurality of hash tables based on the second hash values.

Other implementations of these and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
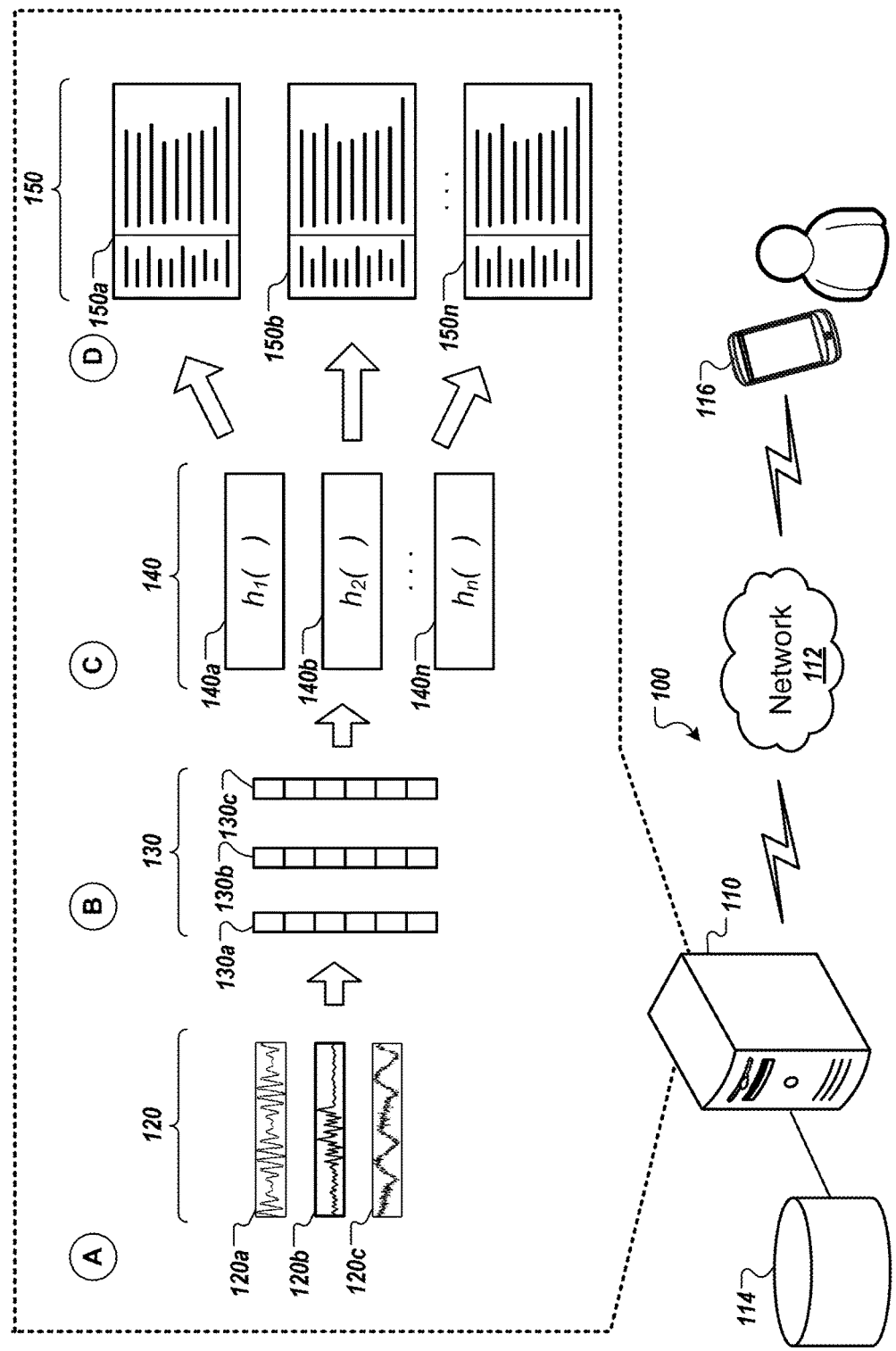
FIGS. 1A and 1B are diagrams illustrating a system for speaker identification.

Speaker identification is one of the core areas of speech processing and acoustic modeling. Applications of speaker identification include authentication in security-critical systems, personalized speech recognition, and searching for speakers in large corpora. Due to the increasing amount of data—especially in web-scale applications—fast processing of speech data is becoming increasingly important. While the audio corpus can usually be pre-processed offline and in parallel, the retrieval procedure directly impacts user latency and needs to be executed as quickly as possible. The techniques discussed below can be used to perform fast, text-independent speaker identification in large corpora. Good identification performance (e.g., accuracy) can be maintained while significantly increasing the speed of retrieval. These techniques can include an i-vector-based speaker identification system combined with locality sensitive hashing (LSH), a powerful tool for approximate nearest neighbor search in high dimensions.

One application of the speaker identification system discussed below is searching web videos for a given speaker. Web-based videos are an example of the challenges of fast retrieval from a large data set. Each day, several years' worth of video are being uploaded to the web. Even if only a small fraction of this video is human speech, the amount of data to be processed for a single query is still very large.

The LSH-based retrieval approach discussed below can be faster than a linear search. In some instances, LSH-based search is several times faster, or even one or more orders of magnitude faster. At the same time, the identification accuracy may be close to or roughly equivalent to the more expensive algorithm. When LSH is used to approximate the cosine-distance of i-vectors, the techniques can be implemented with provable performance guarantees. Implementations of LSH-based similarity search may be used with large data sets, such as data sets of hundreds of thousands of items, millions of items, tens of millions of items, hundreds of millions of items, or a billion items or more. Thus, some implementations can have excellent scalability for large-scale data.

In some implementations, i-vector-based speaker identification techniques are used to identify a speaker. Robustly recognizing a speaker in spite of large inter-session variability such as background noise or different communication channels is one of the main limitations for speaker identification systems. Most techniques can be framed into the Factor Analysis (FA) paradigm, which aims to express the main "factors" contributing to the observed variability in a compact way. Another technique is the Joint Factor Analysis (JFA) formulation, where the acoustic space is divided into different subspaces. These subspaces independently model factors associated with the session variability and factors contributing to the interspeaker variability, e.g., a speaker corresponds to a vector in a low-dimensional subspace.

Another technique is the Total Variability Model (TVM), where all sources of variability (both speaker and session) are modeled together in a single low-dimensional space. In the TVM approach, the low-dimensional vector of latent factors for a given utterance is called an i-vector, and i-vectors are considered sufficient to represent the differences between various utterances. Now, speaker information and undesirable session effects are separated entirely in the i-vector domain. This separation step is typically carried out via classical Linear Discriminant Analysis (LDA) and/or Within Class Covariance Normalization (WCCN). The cosine distance is typically used for the final comparison of a speaker reference i-vector with an utterance i-vector. Hereafter, the Total Variability system followed by the classical LDA and WCCN is referred to simply as Total Variability or TVM.

Probabilistic Linear Discriminant Analysis (PLDA) may be used to independently model the speaker and session factors in the i-vector space with a probabilistic framework. This method uses a hypothesis test for i-vector matching.

In some implementations, locality sensitive hashing may be used to facilitate data retrieval. The nearest neighbor problem is a core element in many search tasks: given a set of a points $\{x_1, \ldots, x_n\} \subseteq X$, a query point $q \in X$ and a distance function $d: X \times X \to \mathbb{R}^+$, find the point $x_i$ minimizing $d(x_i, q)$. While efficient data structures for the exact problem in low-dimensional spaces are known, they have an exponential dependence on the dimension of X ("curse of dimensionality"). In order to circumvent this issue, LSH solves the c-approximate nearest-neighbor problem: instead of finding the nearest neighbor, it suffices to return a point $x_i$ with $d(x_i, q) \leq c \min_{x_j \in X} d(x_j, q)$. An approximate guarantee is still useful because the distance function d is often only an approximation of the ground truth. A particular strength of LSH is its provably sublinear running time, which also holds in practice.

In order to use LSH with a given distance function d, the algorithm relies on a family of locality sensitive hash functions. Intuitively, a hash function is locality sensitive if two elements that are close under d are more likely to collide. Locality sensitive hash functions can include any of various distance metrics, including, for example, the Euclidean distance, the Jaccard index, and the cosine similarity.

Given a family of locality sensitive hash functions, the LSH algorithm builds a set of hash tables and hashes all points $x_i$ into each hash table. For each hash table, several locality sensitive hash functions may be concatenated to avoid unnecessary collisions, which can increase precision. Several hash tables can be maintained to increase the probability of finding a close neighbor, which may improve recall. Given a query point q, the system can look through all hash tables to find the $x_i$ colliding with q and then return the best match.

In some implementations, LSH techniques may be used for speaker identification. For example, LSH may be used for storage and retrieval of i-vectors and data associated with speakers. In some implementations, LSH indexing techniques may be used to select one or more speaker In some implementations, the speaker identification system can generate i-vectors and can retrieve similar i-vectors. In some implementations, given an utterance for which an i-vector should be generated, the utterance is first represented in terms of a large Gaussian mixture model (GMM), the so-called Universal Background Model (UBM), which can be parameterized with $\lambda$. Formally, let $\Theta = (o_1, \ldots, o_o)$ with $o_t \in \mathbb{R}^D$ be a sequence of spectral observations extracted from the utterance. Then the following accumulated and centered first order Baum-Welch statistics are computed as shown below in Equation 1:

$$N_m = \sum_{t=1}^{O} P(m \mid o_t, \lambda)$$

$$F_m = \sum_{t=1}^{O} P(m \mid o_t, \lambda)(o_t - \mu_m),$$

In Equation 1, m is the mean vector of mixture component m, m=1, . . . , C ranges over the mixture components of the UBM and $P(m|o, \lambda)$ is the Gaussian occupation probability for mixture m and observation o. Hereafter, $F \in \mathbb{R}^{CD}$ is referred to as the vector containing the stacked statistics $F = (F_1^T, \ldots, F_C^T)^T$.

The i-vector associated with the sequence $\Theta$ is denoted as $x \in \mathbb{R}^d$. According to the TV model, the vector F is related to x via the rectangular low-rank matrix $T \in \mathbb{R}^{CD \times d}$, known as the TV subspace, as shown in Equation 2:

$$N^{-1}F = Tx,$$

In Equation 2, $T \in \mathbb{R}^{CD \times CD}$ is a diagonal matrix with C blocks of size D×D along the diagonal. Block m=1, . . . , C is the matrix $N_m I_{(D \times D)}$.

The constraints imposed on the distributions of P(x) and P(F|x) lead to a closed-form solution for P(x|F). The i-vector is the mean of this distribution and is given as shown below in Equation 3:

$$x = (I + T^T \Sigma^{-1} NT)^{-1} T^T \Sigma^{-1} F,$$

In Equation 3, $\Sigma \in \mathbb{R}^{CD \times CD}$ is the covariance matrix of F. Therefore, in some implementations, i-vector extraction depends on the utterance data and the TV model parameters $\lambda$, T, and $\Sigma$.

If the true speaker labels for each training i-vector are known, the final speaker i-vector is normally obtained by averaging all i-vectors belonging to the same speaker. In an unsupervised setting, such as using web videos where speaker labels are not available for most of the utterances, the i-vector averaging step can be omitted, and instead the i-vectors of all utterances are kept.

In some implementations, locality-sensitive hashing may be used with i-vectors to identify speakers. One application of the system is enabling fast retrieval of speaker information. In the context of i-vector-based speaker identification, this may include, for example, for a given query i-vector, it may be desirable to find a similar vector in a previously computed set of i-vectors. In some instances, it may be desirable to find the best match, or a set of the closest matches. Since this task is an instance of the nearest neighbor problem introduced above, LSH may be used to enable fast retrieval.

One aspect of using LSH is the choice of distance function d. For i-vectors, the cosine distance may be expressed as shown below in Equation 4:

$$d(x, y) = \frac{x \cdot y}{\|x\| \|y\|}$$

Cosine distance measurements, as shown in Equation 4, gives competitive performance for speaker identification. Since the cosine distance can also be approximated well with locality sensitive hash functions, the cosine distance may be used in the LSH algorithm. In particular, hash functions of the form shown below in Equation 5:

$$h_r(x) = \begin{cases} 1 & \text{if } x \cdot r \geq 0 \\ 0 & \text{if } x \cdot r < 0 \end{cases},$$

In Equation 5, r can be chosen as a random Gaussian vector. Geometrically, this hash function can be seen as hashing with a random hyperplane: r is perpendicular to the hyperplane and the result of the hash function indicates on which side of the hyperplane x lies. Since r has an isotropic distribution, the result is $P[h_r(x) = h_r(y)] = 1 - \Theta(x, y)/\pi$, where (x, y) is the angle between vectors x and y.

The data structure has two main parameters: l, the number of hash tables, and k, the number of hyperplanes per hash table. Let $H_1, \ldots, H_l$ be the hash tables in the data structure. To reduce the number of hash function evaluations, the system can maintain $m \approx \sqrt{l}$ hash functions of length k/2 and use the $$\binom{m}{2} \approx l$$

combinations as hash functions for the l hash tables. Formally, let $u_i(x)=(h_1^i(x), h_2^i(x), \ldots, h_{k/2}^i(x))$ for $i \in \{1, \ldots, m\}$ and $h_j^i(x)$ sampled as described above. Then the hash functions for the hash tables are $h_i(x)=(u_a(x), u_b(x))$ with $1 \leq a < b \leq m$, i.e., each $h_i$ hashes an i-vector x to a string of k bits. Note that it is not necessary to store a full array with 2,000 entries for each hash table. Instead, the system can use standard hashing for large values of k.

For a given database of i-vectors $\{x_1, \ldots, x_n\} \subset \mathbb{R}^D$, the LSH data structure may be initialized as follows: each i-vector $x_i$ is hashed with each hash function $h_j$ and then inserted at position $h_j(x_i)$ in hash table $H_j$. The overall time complexity of the initialization step is $O(ndk\sqrt{l}+nl)$.

Process 1, shown below, describes an example of a retrieval procedure.

---

Process 1 I-vector retrieval with LSH

1:     function RETRIEVEIVECTOR(q)
2:         for i ← 1, . . . , m do
3:             Evaluate $u_i(q)$
4:         C ← { }      ▷ Set of candidates
5:         for i ← 1, . . . , l do
6:             C ← C ∪ $H_i[h_i(q)]$  ▷ Add candidates
7:         return $\mathrm{argmin}_{x \in C} \frac{x \cdot q}{\|x\| \|q\|}$  ▷ Return best candidate

---

In Process 1, the evaluation of the m hash functions $u_i$ in lines 2 and 3 can be efficiently implemented with a vector-matrix multiplication as follows. The normal vectors of the hyperplanes are stacked as rows into a matrix $U \in \mathbb{R}^{mk/2 \times d}$. The bits used in the hash functions are then given by $$\frac{sgn(Ux)+1}{2}.$$

The running time of the retrieval procedure is $O(dk\sqrt{l}+l+M)$, where M is the total number of matches found.

In some instances, speaker vectors are well clustered under well-matched recording conditions and so a small number of candidates in the hash tables may be sufficient to find a correct match. In other instances, the search for matches across data sets having widely varying recording conditions is more challenging and may require iterating over a larger set of candidates.

The techniques discussed herein can be used to allow fast retrieval method for speaker identification in large data sets. The system combines aspects of two approaches that interact via the cosine distance: locality sensitive hashing, which enables fast nearest-neighbor search, and i-vectors, which provide good identification accuracy. Moreover, LSH could also be very useful for other large-scale applications of i-vectors, such as clustering.

Figure 1B:
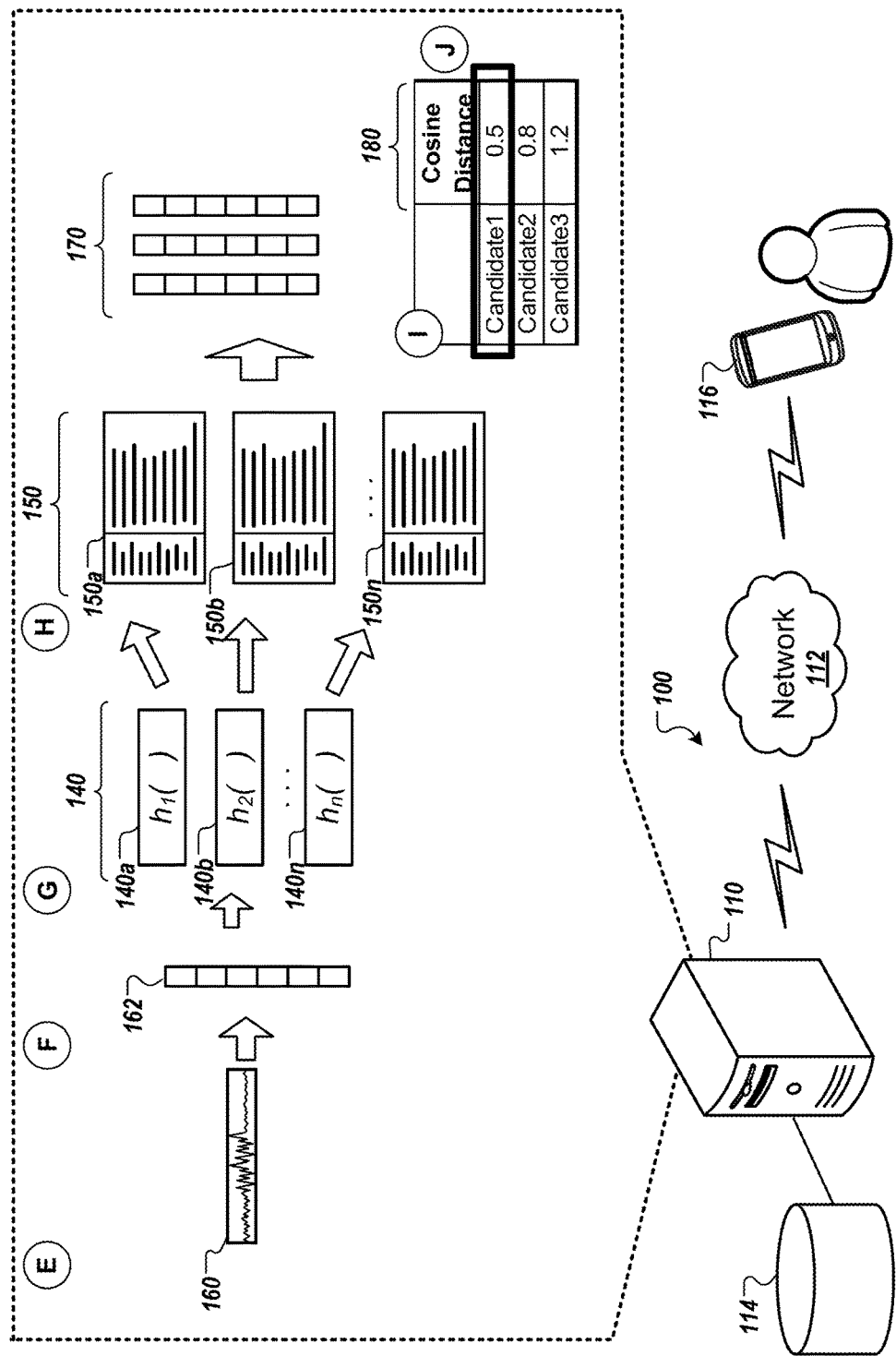

FIGS. 1A and 1B are diagrams illustrating examples of a system 100 for speaker identification. The system 100 includes a computing system 110, a network 112, data storage 114, and a client device 116. In FIG. 1A, the computing system 110 processes audio information and uses LSH to store information about various different speakers. In FIG. 1B, the computing system 110 uses the stored information to identify a speaker of an utterance.

In the system 100, the functions performed by the computing system 110 can be performed by individual computer systems or can be distributed across multiple computer systems. The network 112 can be wired or wireless or a combination of both and can include the Internet. The client device 114 can be, for example, a desktop computer, laptop computer, a tablet computer, a wearable computer, a cellular phone, a smart phone, a music player, an e-book reader, a navigation system, or any other appropriate device.

Referring to FIG. 1A, during stage (A), the speaker identification system 110 accesses audio data 120 that includes utterances of multiple speakers. For example, the audio data 120 may include various audio recordings or videos. In some implementations, the audio data 120 may include data from public data sources, such as videos available on the Internet. Other collections of audio data 120 may additionally or alternatively be used. In the illustrated example, the audio data 120 includes three different audio segments 120a-120c, which each include an utterance of a different speaker. In some implementations, the speaker identification system can use audio data 120 including utterances of hundreds, thousands, or millions of different speakers.

During stage (B), the speaker identification system 110 obtains speaker vectors 130 for the various speakers whose utterances are included in the audio data 112. A speaker vector 130 may be data that indicates characteristics of a speaker's voice. In some implementations, the speaker vectors are i-vectors. In other implementations, the speaker vectors are deep vectors ("d-vectors") determined using a deep neural network. Other data that indicates characteristics of a speaker's voice may be additionally or alternatively be used as a speaker vector.

As discussed above, an i-vector can be a set of parameters extracted or determined using factor analysis of one or more utterances. The i-vector may be data indicative of latent variables of multivariate factor analysis. For example, the i-vector may represent a projection into a low-dimensional, total variability subspace that was trained using factor analysis. The i-vector may indicate audio characteristics that are independent of the words spoken by the speaker. As a result, the i-vector may represent any of various factors indicative of the identity of the speaker, including, for example, characteristics of the speaker's speaking style, the speaker's gender, the speaker's age, the speaker's language, and/or the speaker's accent. The i-vector may be derived from only a portion of an utterance, an entire utterance, or multiple utterances of a speaker.

A d-vector can be as set of speaker-specific features extracted from a layer of a neural network. Various types of neural networks may be sued, including deep neural networks and recurrent neural networks. For example, the d-vector can be a set of activations at an output layer of a neural network, or a set of activations at a hidden layer of a neural network. In some implementations, individual d-vectors for an utterance or for different portions of an utterance may be used as speaker vectors. In some implementations, multiple vectors, e.g., for different portions of an utterance, or for multiple utterances of the same speaker, may be averaged together to form a d-vector.

To generate a d-vector, features extracted from an utterance can be provided as input to a trained neural network. In some implementations, the neural network has been trained to classify inputs of a defined set of speakers, but the speaker that spoke the utterance for which the d-vector is being generated is not required to be in the defined set of speakers. Speech features may be determined for individual speech frames, for example, segments of 10 ms to 50 ms of the utterance. The set of speech features for each frame are input to the neural network, sequentially, with each set of speech features producing a corresponding set of activations at predetermined layer of the neural network. For each input speech frame, a vector may be determined based on the activations at the predetermined output layer. These vectors may each be used as different d-vectors corresponding to the same speaker. In addition or as an alternative, the vectors for multiple speech frames may be averaged together. The averaged vector, like the d-vectors for individual frames, may be saved as a d-vector that indicates qualities characteristic of the speaker's voice.

A speaker vector 130a-130c may be generated from each audio segment 120a-120c. For example, when the audio data 120 includes various audio files or video files, a different speaker vector may be generated for each file, to indicate the characteristics of the utterances in that file. As a result, the speaker vector 130a indicates characteristics of the voice of the speaker of the utterances in the audio segment 120a, the speaker vector 130b indicates characteristics of the voice of the speaker of the utterances in the audio segment 120b, and so on. If a particular audio segment includes speech of multiple speakers, a separate speaker vector may be generated for each speaker. For example, a recording with speech of multiple speakers may be split into separate segments each including utterances of a single speaker. As a result, processing a particular recording may result in multiple speaker vectors that each correspond to a different speaker.

In some implementations, a speaker vector may be determined using multiple utterances or multiple recordings for a single speaker. For example, multiple recordings of a particular speaker may be identified, for example, based on labels assigned to the recordings. A different i-vector may be generated from each recording, and the i-vectors may be averaged or otherwise combined to form an average or composite speaker vector that represents characteristics of the particular speaker's voice.

In some implementations, a speaker whose utterances are recorded in an audio segment 120a-120c may be unknown. When a name or other identifying information of the speaker is not known, the speaker vector may be associated with information indicating the source of the audio segment, such as a URL or other identifier for the audio recording or video that included the utterances from which the speaker vector was derived.

During stage (C), the speaker identification system 110 determines keys or index values for each speaker vector 130a-130c. The keys or indexes can be hash values, for example, hash values determined using one or more LSH algorithms. For each speaker vector 130a-130c, a hash value may be determined for each of multiple hash functions 140. In the illustrated example, a set of n hash functions 140a-140n are used. As a result, for each speaker vector 130a-130c, n different hash values may be determined.

In some implementations, hash values for a speaker may be determined based on a position of a speaker vector with respect to different hyperplanes, such as random or pseudo-random hyperplanes. For example, a set of k-dimensional hyperplanes may be defined. A hash value may be determined by projecting the speaker vector onto the k-dimensional space and making a binary determination, for each hyperplane, which side of the hyperplane the projection falls. The comparison of the projection with each hyperplane may produce one bit of the hash value.

Hash values may also be determined by combining or concatenating hash values or other values derived from speaker vectors. Calculating shorter hash values may require less computation, but longer hash values may be desirable to allow for greater precision. In addition, longer hash values often lead to fewer hash collisions in a hash table. If three hash values A, B, and C are determined for a particular speaker vector, a set of longer hash values may be determined by concatenating different combinations of the hash values, for example, generating hash values AB, AC, and BC. In this example, the length of the hash values doubles and the only computation required is the concatenation operation.

During stage (D), the speaker identification system 100 stores associations between the keys or index values and corresponding speaker vectors 130a-130c. Data identifying the speaker corresponding to a speaker vector, or a source of the audio data was used to determine the speaker vector, may be associated with the keys or index values. The associations may be stored in the data storage 114, for example, in an associative array such as a hash table, for later use in identifying speakers.

In the illustrated example, speaker vectors 130a-130c are stored in a plurality of hash tables 150. A set of n hash tables 150a-150n are used, with one hash table 150a-150n corresponding to each hash function 140a-140n. An entry for each speaker vector 130a-130c is included in each hash table 150a-150. For example, in hash table 150a, the speaker vector 130a is associated with the hash value determined by applying the hash function 140a to the speaker vector 130a. In hash table 150b, the same speaker vector 130a is associated with the hash value determined by applying the hash function 140b to the speaker vector 130a. The pattern continues for all of the n hash tables, so that in hash table 150n, the speaker vector 130a is associated with the hash value determined by applying the hash function 140n to the speaker vector 130a. The other speaker vectors 130b, 130c and their associated speaker information are indexed in the hash tables 150a-150n in the same manner.

Associating the speaker vectors 130a-130c with different hash values in different hash tables can increase the likelihood of identifying appropriate speaker vectors during speaker identification. Some hash functions may indicate that certain items match or are similar, while other hash functions may not. As a result, it may be easier to identify speaker vectors as similar to a particular vector using multiple hash functions and multiple hash tables than when using a single hash function and a single hash table.

Referring to FIG. 1B, the speaker identification system 110 uses the hash tables to identify a speaker of an utterance. During stage (E), the speaker identification system 110 receives data that identifies an utterance 160 of a speaker to be identified. The utterance 160 may be identified in or included in a request to identify the speaker of the utterance 160, or a request for other content containing utterances of the same speaker. For example, the client device 116 may provide an audio recording that includes an utterance or a video that includes an utterance. As another example, the speaker identification system 110 may receive an identifier, such as a Uniform Resource Locator (URL) for a resource that includes a recording of an utterance. Having found a particular video of interest in a large video collection, a user may desire to find other videos in the collection that involve the same speaker or speakers as the particular video.

During stage (F), the speaker identification system 110 obtains an utterance vector 162 for the utterance 160. The utterance vector 162 can indicate characteristics of the voice of the speaker of the utterance 160. In particular, the utterance vector 162 may indicate characteristics of the utterance 160 independent of the specific words or sounds spoken. The utterance vector 162 can be determined in the same manner as the speaker vectors 130*a*-130*c* discussed above. In some implementations, when the speaker vectors 130*a*-130*c* are i-vectors, the utterance vector 162 may also be an i-vector. In other implementations, when the speaker vectors 130*a*-130*c* are d-vectors, the utterance vector may also be a d-vector. Other data that indicates characteristics of a speaker's voice may be additionally or alternatively be used as an utterance vector 162.

During stage (G), the speaker identification system 110 determines keys or index values using the utterance vector 162. For example, multiple hash values may be determined. Each of the hash functions 140*a*-140*n* may be applied to the utterance vector 162 to generate n hash values. As discussed above, the hash functions 140*a*-140*n* may use locality-sensitive algorithms so that similar inputs to the hash functions 140*a*-140*n* produce similar outputs. For example, the outputs may be clustered according to similarity of the inputs, or the differences between outputs may generally correspond to a cosine distance or other distance between the inputs.

During stage (H), the speaker identification system 110 uses the keys or index values to identify a set of speaker vectors 170. The hash values that are generated based on the utterance vector 162 can be used to identify similar speaker vectors in the hash tables 150*a*-150*n*. For example, the hash value produced by applying the hash function 140*a* to the utterance vector 162 is used to identify speaker vectors from the hash table 150*a*. The hash value produced by applying the hash function 140*b* to the utterance vector 162 is used to identify speaker vectors from the hash table 150*b*, and so on. Speaker vectors may be retrieved from any or all of the hash tables 150*a*-150*n*, and different speaker vectors may be obtained from different hash tables 150*a*-150*n*.

In some implementations, the set of candidate speaker vectors 170 may be selected using all of the hash tables 150*a*-150*n*. For example, a lookup may be performed for each of the hash tables 150*a*-150*n*, and in some instances, one or more speaker vectors may be selected from each of the hash tables 150*a*-150*n*. In some implementations, each speaker vector that is identified from any of the hash tables 150*a*-150*n* is included in the set of candidate speaker vectors 170. In some implementations, a speaker vector is included in the set of candidate speaker vectors 170 only if the same speaker vector is selected from multiple hash tables 150*a*-150*n*. A minimum threshold number can be set. A speaker vector may be included in the set of candidate speaker vectors 170 only when the same speaker vector is selected from a number of the hash tables 150*a*-150*n* that is equal to or greater than the minimum threshold. For example, if the threshold is set to 2, speaker vectors retrieved from only a single hash table 150*a*-150*n* would not be included, but speaker vectors that are retrieved from each of two or more different hash tables 150*a*-150*n* would be included in the set of candidate speaker vectors 170.

The set 170 is a group of candidate speaker vectors that have a degree of similarity to the utterance vector 162. Since locality-sensitive hashing is used to select the speaker vectors in the set 170, the set 170 may include the vectors that are most similar to the utterance vector 162. For example, using LSH hash functions that approximate cosine distance measures, the speaker vectors may be those that have the lowest cosine distance relative to the utterance vector 162. As a result, a very large set of speaker vectors can be quickly narrowed down to a subset that is most likely to be similar to the utterance vector 162. Rather than comparing the utterance vector 162 to every speaker vector one by one, the utterance vector 162 may be compared with the speaker vectors included in the set 170 of candidate speaker vectors.

During stage (I), the speaker identification system 110 compares the utterance vector 162 with the speaker vectors in the set 170 of candidate speaker vectors. In some implementations, the speaker identification system 110 determines similarity scores 180 that indicate how similar each speaker vector in the set 170 is to the utterance vector 162. For example, the speaker identification system 110 may determine a cosine distance between each speaker vector in the set 170 and the utterance vector.

During stage (J) the speaker identification system 110 selects a speaker vector from the set 170 based on the similarity scores 180. For example, the speaker vector having the highest degree of similarity to the utterance vector 162 may be selected. In the example of FIG. 1A, the speaker vector having the smallest cosine distance from the utterance vector 162 is selected. The speaker whose utterance was used to generate the selected speaker vector may be considered to be the most likely speaker of the utterance 160. As a result, the name or other information about the speaker associated with the selected speaker vector may be accessed and provided, for example, to the client device 116 or another device. In some implementations, audio or video that was used to generate the selected speaker vector may be provided. As a result, data identifying media items including utterances of the same speaker that spoke the utterance 160 may be provided to the client device 116.

In some implementations, a similarity threshold is set, and a speaker vector is selected only if the most similar speaker vector satisfies the similarity threshold. For example, a maximum cosine distance threshold may be set. Cosine distance scores that exceed the threshold may be considered too different to represent the same speaker as the utterance 162, and may not be selected as likely being the same speaker. In some instances, the most similar speaker vector in the set 170 may not satisfy the similarity threshold, and so the speaker identification system 110 may determine that no speaker can be identified with a high degree of confidence. In some instances, multiple speaker vectors from the set 170 may satisfy the similarity threshold, indicating that multiple good candidate speakers have been identified. When each speaker vector represents a different media item, each speaker vector having a similarity score that satisfies the threshold may be likely to include speech of the same speaker. In some implementations, the speaker identification system 110 indicates multiple of or each of the speakers or media items corresponding to speaker vectors satisfying the similarity threshold.

Figure 2:
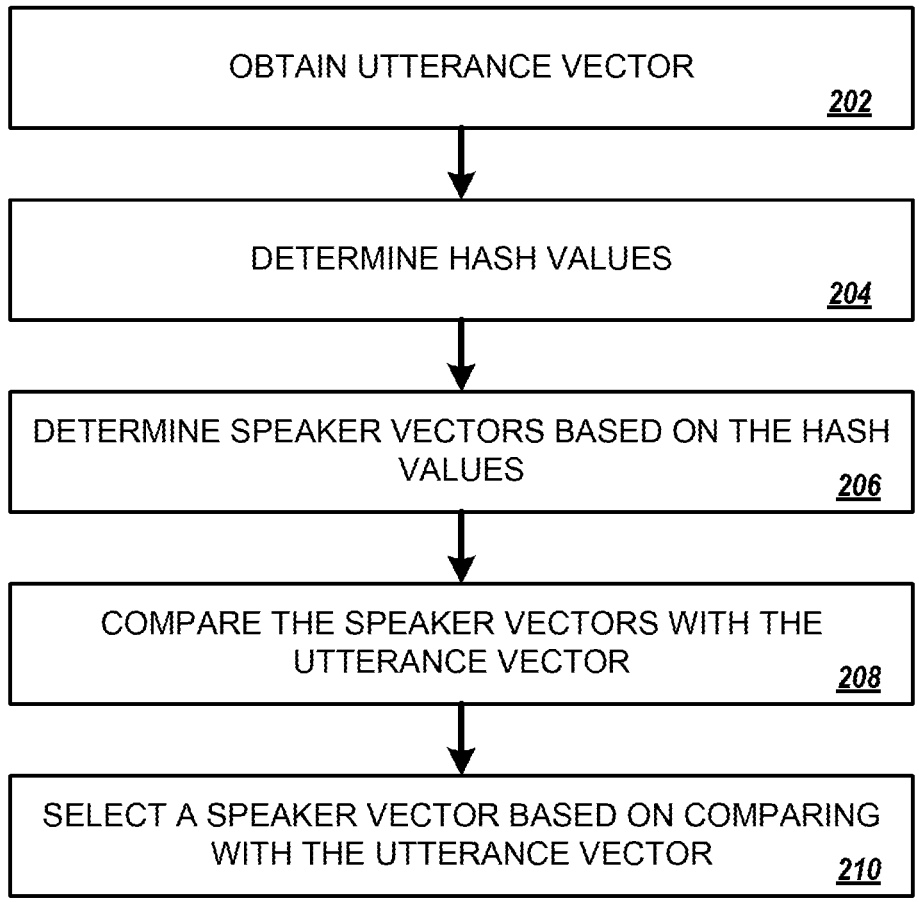
FIG. 2 is a flow diagram illustrating a process for speaker identification.

FIG. 2 is a flow diagram illustrating an example of a process 200 for speaker identification. The process may be performed by one or more computing systems, such as the computing system 110 of FIGS. 1A and 1B.

An utterance vector for an utterance is obtained (202). In some implementations, the utterance vector is an utterance i-vector comprising parameters determined using multivariate factor analysis of the utterance. In some implementations, the utterance vector includes parameters determined based on deep neural network activations that occur in response to information about the utterance being provided to a trained deep neural network.

Hash values are determined for the utterance vector according to multiple different hash functions (204). In some implementations, the hash values are determined using one or more locality sensitive hash functions. For example, the hash values may be determined based on a position of the utterance i-vector with respect to different hyperplanes, such as random or pseudo-random hyperplanes.

In some implementations, hash values are determined as a combination of other hash values. For example, to determine the hash values, first hash values for the utterance vector can be determined based on a first set of hash functions. Second hash values may also be determined as different combinations of two or more of the first hash values. For example, the second hash values can each be a different permutation of the first hash values.

A set of speaker vectors is determined using the hash values (206). For example, a candidate set of speaker vectors can be selected from a plurality of hash tables. The set of speaker vectors determined using the hash values is a proper subset of the speaker vectors in the hash tables. For example, a set of candidate speaker vectors may be selected, where the number of candidate speaker vectors is an order of magnitude smaller, or several orders of magnitude smaller, than the total number of speaker vectors referenced by the hash tables. In some instances, the set includes only a few speaker vectors, for example, one or two of the speaker vectors selected from each hash table.

The hash values for the utterance vector may each correspond to a different one of the hash tables. The speaker vectors that correspond to the hash values of the utterance vector, if any exist, may be identified and included in the candidate set. In some implementations, one or more other speaker vectors may also be selected. For example, a system may select speaker vectors that are not associated with the exact hash values determined for the utterance vector but are nonetheless associated with similar or nearby hash values, e.g., hash values within a range or cluster about the hash values for the utterance.

In some implementations the set of speaker vectors is a set of speaker i-vectors where each speaker i-vector includes parameters determined using multivariate factor analysis of one or more utterances of a respective speaker. In some implementations the set of speaker vectors is a set of speaker vectors in which each speaker vector includes parameters determined based on deep neural network activations that occur in response to information about one or more utterances of a respective speaker being provided to the deep neural network.

The speaker vectors in the set are compared with the utterance vector (208). For example, similarity scores can be generated to indicate the degree of similarity of the utterance vector and each of the speaker vectors. In some implementations, a cosine distance is computed between the utterance vector and each of the speaker vectors in the candidate set.

A speaker vector is selected from the set based on comparing the speaker vectors in the set with the utterance vector (210). For example, the speaker vector that has the smallest cosine distance with respect to the utterance vector can be selected. The speaker corresponding to the selected speaker vector can be determined to be the likely speaker of the utterance.

In some implementations, data is accessed that indicates associations between speaker vectors and the respective speakers. Based on the data, a speaker identity corresponding to the selected speaker vector can be identified. Data indicating the speaker identity can then be output.

In some implementations, once the speaker of the utterance is identified, one or media items that include utterances of the identified speaker are also identified. Data indicating the media items that include utterances of the identified speaker may then be provided to a user. The system may indicate that the media includes speech or other content relating to the same person, and the system may indicate the identity of the person. For example, a user watching a particular video on the internet may request other videos involving the same person or people. A system may analyze the utterances in the particular video, identify the speaker, and provide links or other information about additional videos that also include speech of the same person or people.

In some implementations, the speaker identification techniques may be used for authentication. For example, it may be determined that the selected speaker vector corresponds to a particular user, and based on the determination, the particular user may be authenticated to, for example, a device, application, website, or service.

Figure 3:
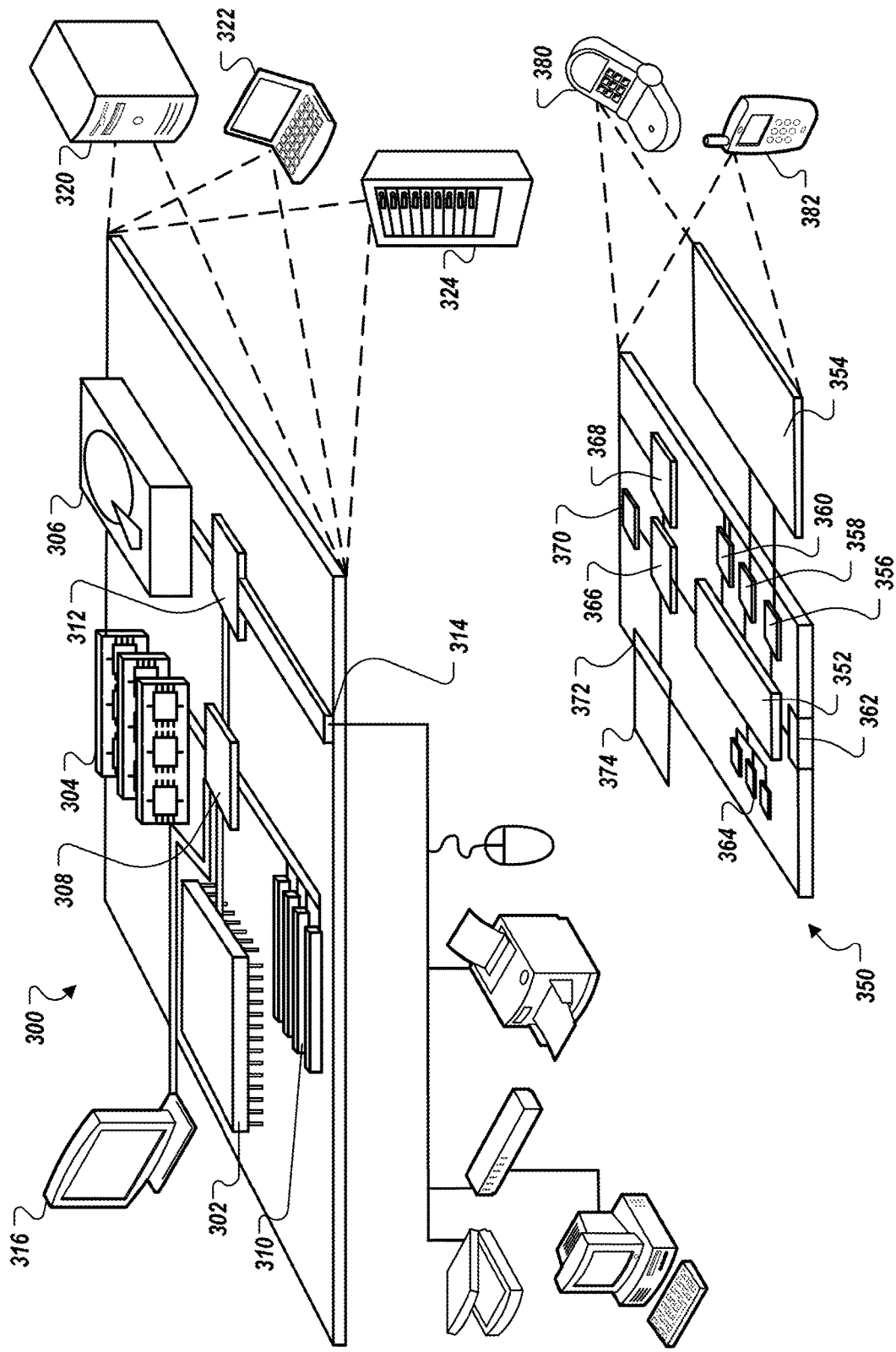
FIG. 3 is a schematic diagram that shows an example of a computing device and a mobile computing device.

FIG. 3 shows an example of a computing device 300 and an example of a mobile computing device 350 that can be used to implement the techniques described above. The computing device 300 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 300 includes a processor 302, a memory 304, a storage device 306, a high-speed interface 308 connecting to the memory 304 and multiple high-speed expansion ports 310, and a low-speed interface 312 connecting to a low-speed expansion port 314 and the storage device 306. Each of the processor 302, the memory 304, the storage device 306, the high-speed interface 308, the high-speed expansion ports 310, and the low-speed interface 312, are interconnected using various busses, and may be mounted on a common motherboard or in other manners as appropriate. The processor 302 can process instructions for execution within the computing device 300, including instructions stored in the memory 304 or on the storage device 306 to display graphical information for a GUI on an external input/output device, such as a display 316 coupled to the high-speed interface 308. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 304 stores information within the computing device 300. In some implementations, the memory 304 is a volatile memory unit or units. In some implementations, the memory 304 is a non-volatile memory unit or units. The memory 304 may also be another form of computer-readable medium, such as a magnetic or optical disk.

The storage device 306 is capable of providing mass storage for the computing device 300. In some implementations, the storage device 306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The computer program product can also be tangibly embodied in a computer- or machine-readable medium, such as the memory 304, the storage device 306, or memory on the processor 302.

The high-speed interface 308 manages bandwidth-intensive operations for the computing device 300, while the low-speed interface 312 manages lower bandwidth-intensive operations. Such allocation of functions is exemplary only. In some implementations, the high-speed interface 308 is coupled to the memory 304, the display 316 (e.g., through a graphics processor or accelerator), and to the high-speed expansion ports 310, which may accept various expansion cards (not shown). In the implementation, the low-speed interface 312 is coupled to the storage device 306 and the low-speed expansion port 314. The low-speed expansion port 314, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. In addition, it may be implemented in a personal computer such as a laptop computer 322. It may also be implemented as part of a rack server system 324. Alternatively, components from the computing device 300 may be combined with other components in a mobile device (not shown), such as a mobile computing device 350. Each of such devices may contain one or more of the computing device 300 and the mobile computing device 350, and an entire system may be made up of multiple computing devices communicating with each other.

The mobile computing device 350 includes a processor 352, a memory 364, an input/output device such as a display 354, a communication interface 366, and a transceiver 368, among other components. The mobile computing device 350 may also be provided with a storage device, such as a micro-drive or other device, to provide additional storage. Each of the processor 352, the memory 364, the display 354, the communication interface 366, and the transceiver 368, are interconnected using various buses, and several of the components may be mounted on a common motherboard or in other manners as appropriate.

The processor 352 can execute instructions within the mobile computing device 350, including instructions stored in the memory 364. The processor 352 may be implemented as a chipset of chips that include separate and multiple analog and digital processors. The processor 352 may provide, for example, for coordination of the other components of the mobile computing device 350, such as control of user interfaces, applications run by the mobile computing device 350, and wireless communication by the mobile computing device 350.

The processor 352 may communicate with a user through a control interface 358 and a display interface 356 coupled to the display 354. The display 354 may be, for example, a TFT (Thin-Film-Transistor Liquid Crystal Display) display or an OLED (Organic Light Emitting Diode) display, or other appropriate display technology. The display interface 356 may comprise appropriate circuitry for driving the display 354 to present graphical and other information to a user. The control interface 358 may receive commands from a user and convert them for submission to the processor 352. In addition, an external interface 362 may provide communication with the processor 352, so as to enable near area communication of the mobile computing device 350 with other devices. The external interface 362 may provide, for example, for wired communication in some implementations, or for wireless communication in other implementations, and multiple interfaces may also be used.

The memory 364 stores information within the mobile computing device 350. The memory 364 can be implemented as one or more of a computer-readable medium or media, a volatile memory unit or units, or a non-volatile memory unit or units. An expansion memory 374 may also be provided and connected to the mobile computing device 350 through an expansion interface 372, which may include, for example, a SIMM (Single In Line Memory Module) card interface. The expansion memory 374 may provide extra storage space for the mobile computing device 350, or may also store applications or other information for the mobile computing device 350. Specifically, the expansion memory 374 may include instructions to carry out or supplement the processes described above, and may include secure information also. Thus, for example, the expansion memory 374 may be provide as a security module for the mobile computing device 350, and may be programmed with instructions that permit secure use of the mobile computing device 350. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 364, the expansion memory 374, or memory on the processor 352. In some implementations, the computer program product can be received in a propagated signal, for example, over the transceiver 368 or the external interface 362.

The mobile computing device 350 may communicate wirelessly through the communication interface 366, which may include digital signal processing circuitry where necessary. The communication interface 366 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 368 using a radio-frequency. In addition, short-range communication may occur, such as using a Bluetooth, Wi-Fi, or other such transceiver (not shown). In addition, a GPS (Global Positioning System) receiver module 370 may provide additional navigation- and location-related wireless data to the mobile computing device 350, which may be used as appropriate by applications running on the mobile computing device 350.

The mobile computing device 350 may also communicate audibly using an audio codec 360, which may receive spoken information from a user and convert it to usable digital information. The audio codec 360 may likewise generate audible sound for a user, such as through a speaker, e.g., in a handset of the mobile computing device 350. Such sound may include sound from voice telephone calls, may include recorded sound (e.g., voice messages, music files, etc.) and may also include sound generated by applications operating on the mobile computing device 350.

The mobile computing device 350 may be implemented in a number of different forms, as shown in the figure. For example, it may be implemented as a cellular telephone 380. It may also be implemented as part of a smart-phone 382, personal digital assistant, tablet computer, wearable computer, or other similar mobile device.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method performed by one or more computers, the method comprising:
   receiving, by the one or more computers, a request from a client device, the request including data identifying a media item including speech of a speaker;
   based on the received data identifying the media item including speech of the speaker, identifying, by the one or more computers, one or more other media items that include speech of the speaker;
   generating, by the one or more computers, one or more search results that each reference a respective media item of the one or more other media items that include speech of the speaker; and
   providing, by the one or more computers and to the client device, a response to the request that includes the one or more search results for display.

2. The method of claim 1, wherein receiving the request comprises receiving a request that includes a URL that identifies (i) a video that includes speech of the speaker, or (ii) an audio recording that includes speech of the speaker.

3. The method of claim 1, wherein receiving the request comprises receiving a request for other content containing speech of the speaker whose speech is included in the media item.

4. The method of claim 1, wherein receiving the request comprises receiving the media item from the client device over a network, the received media item comprising (i) video data that includes speech of the speaker, or (ii) audio data that includes speech of the speaker.

5. The method of claim 1, further comprising providing, for display with the one or more search results, a name of the speaker.

6. The method of claim 5, further comprising determining the name of the speaker based on comparison of speech characteristics determined from speech in the media item with speech characteristics determined from speech in additional media items that include speech of the speaker.

7. The method of claim 1, wherein receiving the request comprises receiving a request to determine an identity of the speaker whose speech is included in the media item.

8. The method of claim 1, wherein the media item includes speech of multiple speakers; and
   wherein identifying the one or more other media items comprises identifying one or more other media items that each include speech of each of the multiple speakers.

9. The method of claim 8, further comprising providing, for display with the one or more search results, a name of each of the multiple speakers.

10. The method of claim 1, wherein generating the one or more search results comprises generating one or more search results that each include a link to a media item that is available on the Internet and that includes speech of the speaker.

11. The method of claim 1, wherein identifying the one or more other media items comprises identifying the one or more other media items based on audio characteristics of the identified media item.

12. The method of claim 1, wherein identifying the one or more other media items comprises identifying multiple media items based on records of multiple different indexes that have records indexed using different indexing functions.

13. A system comprising:
one or more computers; and
one or more computer-readable media storing instructions that, when executed by the one or more computers, cause the one or more computers to perform operations comprising:
receiving, by the one or more computers, a request from a client device, the request including data identifying a media item including speech of a speaker;
based on the received data identifying the media item including speech of the speaker, identifying, by the one or more computers, one or more other media items that include speech of the speaker;
generating, by the one or more computers, one or more search results that each reference a respective media item of the one or more other media items that include speech of the speaker; and
providing, by the one or more computers and to the client device, a response to the request that includes the one or more search results for display.

14. The system of claim 13, wherein receiving the request comprises receiving a request that includes a URL that identifies (i) a video that includes speech of the speaker, or (ii) an audio recording that includes speech of the speaker.

15. The system of claim 13, wherein receiving the request comprises receiving a request for other content containing speech of the speaker whose speech is included in the media item.

16. The system of claim 13, wherein receiving the request comprises receiving the media item from the client device over a network, the received media item comprising (i) video data that includes speech of the speaker, or (ii) audio data that includes speech of the speaker.

17. One or more non-transitory computer-readable media storing instructions that, when executed by one or more computers, cause the one or more computers to perform operations comprising:
receiving, by the one or more computers, a request from a client device, the request including data identifying a media item including speech of a speaker;
based on the received data identifying the media item including speech of the speaker, identifying, by the one or more computers, one or more other media items that include speech of the speaker;
generating, by the one or more computers, one or more search results that each reference a respective media item of the one or more other media items that include speech of the speaker; and
providing, by the one or more computers and to the client device, a response to the request that includes the one or more search results for display.

18. The one or more non-transitory computer-readable media of claim 17, wherein receiving the request comprises receiving a request that includes a URL that identifies (i) a video that includes speech of the speaker, or (ii) an audio recording that includes speech of the speaker.

19. The one or more non-transitory computer-readable media of claim 17, wherein receiving the request comprises receiving a request for other content containing speech of the speaker whose speech is included in the media item.

20. The one or more non-transitory computer-readable media of claim 17, wherein receiving the request comprises receiving the media item from the client device over a network, the received media item comprising (i) video data that includes speech of the speaker, or (ii) audio data that includes speech of the speaker.

* * * * *